US012531348B2

(12) United States Patent

Xing et al.

(10) Patent No.: US 12,531,348 B2
(45) Date of Patent: Jan. 20, 2026

(54) ARRAY ANTENNA AND MOBILE TERMINAL

(71) Applicant: TCL COMMUNICATION (NINGBO) CO., LTD., Zhejiang (CN)

(72) Inventors: Hongjuan Xing, Zhejiang (CN); Hai Cai, Zhejiang (CN)

(73) Assignee: TCL COMMUNICATION (NINGBO) CO., LTD., Zhejiang (CN)

(*) Notice: Subject to any disclaimer, the term of this patent is extended or adjusted under 35 U.S.C. 154(b) by 257 days.

(21) Appl. No.: 18/249,544

(22) PCT Filed: Dec. 9, 2020

(86) PCT No.: PCT/CN2020/134928

§ 371 (c)(1),
(2) Date: Apr. 19, 2023

(87) PCT Pub. No.: WO2022/082959

PCT Pub. Date: Apr. 28, 2022

(65) Prior Publication Data

US 2023/0395991 A1 Dec. 7, 2023

(30) Foreign Application Priority Data

Oct. 19, 2020 (CN) ......................... 202011120353.7

(51) Int. Cl.
*H01Q 21/00* (2006.01)
*H01Q 5/28* (2015.01)
(Continued)

(52) U.S. Cl.
CPC ........... *H01Q 21/0006* (2013.01); *H01Q 5/28* (2015.01); *H01Q 5/50* (2015.01); *H01Q 21/065* (2013.01)

(58) Field of Classification Search
CPC ........ H01Q 21/0006; H01Q 5/28; H01Q 5/50; H01Q 21/065
See application file for complete search history.

(56) References Cited

U.S. PATENT DOCUMENTS 6,147,648 A 11/2000 Granholm et al.
2017/0279197 A1* 9/2017 Sharawi .................. H01Q 3/40

FOREIGN PATENT DOCUMENTS

CN 201536151 U 7/2010
CN 105514611 A 4/2016
(Continued)

OTHER PUBLICATIONS

Written Opinion of the International Search Authority in international application No. PCT/CN2020/134928, mailed on Jun. 30, 2021.

(Continued)

*Primary Examiner* — Henry Luong

(74) *Attorney, Agent, or Firm* — PV IP PC; Wei Te Chung

(57) ABSTRACT

The present application provides an array antenna and a mobile terminal. This application increases the number of array elements through the arrangement of the plurality of rows of array elements, thereby reducing the maximum gain reduction of the array antenna in the maximum scan area, and by the arrangement, each feeding network supports the 28 GHz frequency band and the 39 GHz frequency band such that 2*2 MIMO signal differential communication is realized for each array element, thereby achieving support of dual-frequency and dual-polarization signals by the array antenna. Meanwhile, it can automatically adjust the antenna array form according to the strength of signals, thereby reducing the input power, improving the energy efficiency of the system and dynamically adjusting chip operating temperature.

14 Claims, 6 Drawing Sheets

(51) Int. Cl.
*H01Q 5/50* (2015.01)
*H01Q 21/06* (2006.01)

(56) References Cited

FOREIGN PATENT DOCUMENTS

| | | | | | |
|---|---|---|---|---|---|
| CN | 110061353 | A | * | 7/2019 | ........... H01Q 19/104 |
| CN | 110137672 | A | * | 8/2019 | ............... H01Q 1/36 |
| CN | 110600869 | A | * | 12/2019 | ............... H01Q 1/36 |
| CN | 211480293 | U | | 9/2020 | |
| EP | 0447218 | A2 | | 9/1991 | |

OTHER PUBLICATIONS

International Search Report in International application No. PCT/CN2020/134928, mailed on Jun. 30, 2021.
Chinese Office Action issued in corresponding Chinese Patent Application No. 202011120353.7 dated Jun. 1, 2021, pp. 1-9.
European Search Report in European application No. 20958534.8, mailed on Oct. 14, 2024.

* cited by examiner

ARRAY ANTENNA AND MOBILE TERMINAL

This application claims the priority of International Application No. PCT/CN2020/134928, filed Dec. 9, 2020, which claims priority to Chinese Application No. 202011120353.7, filled on Oct. 19, 2020. The entire disclosures of each of the applications are incorporated herein by reference.

TECHNICAL FIELD

The present application relates to antenna equipments, and more particularly to an array antenna and a mobile terminal.

Background Arts

With the advent of the fifth generation of mobile communication (5G), millimeter wave (mm wave) technology has become the primary means to realize 5G ultra-high data transmission rate because of its advantages of high transmission frequency, large bandwidth and high communication system capacity.

However, in existing arts, at the maximum scan angle of the array antenna, the maximum gain of the antenna drops greatly, and the array gain is low because the number of array elements is small. In order to meet the requirements of communication network, the input power of each array element increases. As a result, heat dissipation of the signal chip is concentrated such that its operating temperature is high, thereby reducing the efficiency of entire system.

Technical Problems

The embodiments of the present application provide an array antenna and a mobile terminal, for solving the problem that the maximum gain of the antenna drops greatly at the maximum scan angle of the array antenna and the problem that the efficiency of entire system is reduced, caused by concentrated heat dissipation of the chip, leading to high operating temperature of the chip, since it is necessary to increase the input power of each array element in order to meet the requirements of communication network, for the situation that the array gain is low because the number of array elements is small.

Technical Solutions

The present application provides an array antenna, including: a first dielectric layer; a ground layer, disposed on the first dielectric layer; a second dielectric layer, disposed on the ground layer; and a conductive patch layer, disposed on the second dielectric layer, wherein the conductive patch layer is provided with an M*N linear antenna array, where M and N are positive integers greater than or equal to 2, and each array element of the linear antenna array includes a rectangular conductive patch and two feeding networks.

Further, the first dielectric layer is provided with a plurality of first feeders and a plurality of second feeders, and arrangement directions of the first feeders and the second feeders are perpendicular to each other.

Further, the ground layer is provided with a plurality of first slits and a plurality of second slits, and arrangement directions of the first slits and the second slits are perpendicular to each other.

Further, the arrangement direction of the first slit is perpendicular to the arrangement direction of the first feeder, and the arrangement direction of the second slit is perpendicular to the arrangement direction of the second feeder, projections of the first slit and the first feeder on the first dielectric layer are intersected with each other, and projections of the second slit and the second feeder on the first dielectric layer are intersected with each other.

Further, each of two opposite corners of the rectangular conductive patch is provided with a square cutout.

Further, the linear antenna array includes a first row of array elements and a second row of array elements, the two feeding networks of the first row of array elements correspond to two adjacent edges of a first corner of the rectangular conductive patch in one-to-one correspondence, the two feeding networks of the second row of array elements correspond to two adjacent edges of a second corner of the rectangular conductive patch in one-to-one correspondence, the first corner is an angle corresponding to the square cutout, and the second corner is an adjacent angle of the first corner.

Further, each array element of the linear antenna array receives or transmits horizontally polarized signals and vertically polarized signals; or the first row of array elements of the linear antenna array receive or transmit horizontally polarized signals, and the second row of array elements receive or transmit vertically polarized signals; or the first row of array elements of the linear antenna array receive or transmit vertically polarized signals, and the second row of array element receive or transmit horizontally polarized signals.

Further, a feeding mode of the array antenna includes coupling feeding.

Further, operating frequency bands of each of the feeding networks include a 28 GHz frequency band and a 39 GHz frequency band.

According to another aspect of the present application, the present application provides a mobile terminal, which including the afore-described array antenna.

Beneficial Effects

The embodiments of the present application provides an array antenna and a mobile terminal. By increasing the number of array elements through the arrangement of the plurality of rows of array elements, the maximum gain reduction of the array antenna in the maximum scan area is reduced. By the arrangement, each feeding network supports the 28 GHz frequency band and the 39 GHz frequency band such that 2*2 MIMO signal differential communication is realized for each array element, thereby achieving support of dual-frequency and dual-polarization signals by the array antenna. Meanwhile, it can automatically adjust the antenna array form according to the strength of signals, thereby reducing the input power, improving the energy efficiency of the system and dynamically adjusting chip operating temperature.

DESCRIPTION OF DRAWINGS

The technical solutions and beneficial effects of the present application will be more apparent with reference to the detailed description of the embodiments of the present application below in accompanying with the drawings.

DESCRIPTION OF EMBODIMENTS OF THE INVENTION

The technical solutions in the embodiments of the present application will be clearly and completely described below with reference to appended drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope of the present application.

Figure 1:
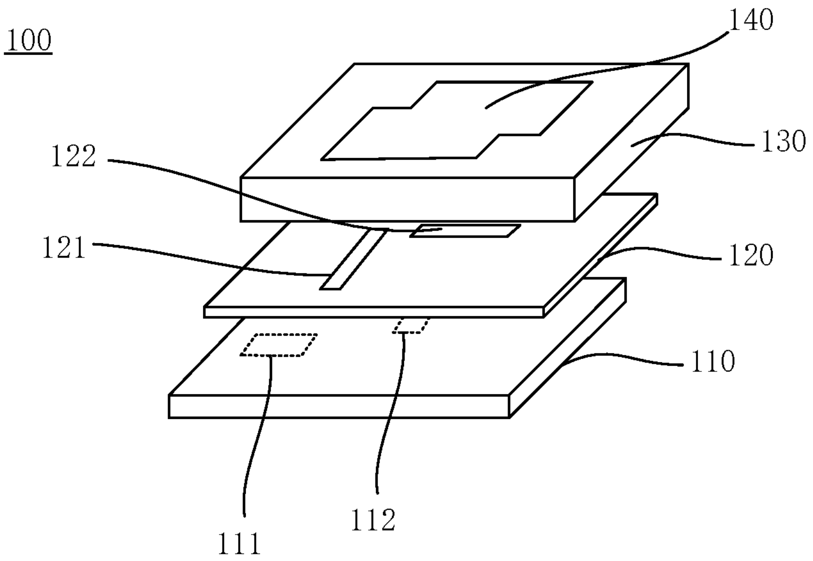
FIG. 1 is a structural schematic diagram illustrating an array antenna provided in an embodiment of the present application.

As shown in FIG. 1, the present application provides an array antenna (FIG. 1 only shows a partial structure of the array antenna), which includes a first dielectric layer 110, a first feeder 111, a second feeder 112, a ground layer 120, a first slit 121, a second slit 122, a second dielectric layer 130 and a conductive patch layer 140. The array antenna is applicable to a mobile phone, a Customer Premise Equipment (CPE), a computer, an extended reality device and a TV device.

The first dielectric layer 110 has a plurality of first feeders 111 and a plurality of second feeders 112, and the arrangement directions of the first feeders 111 and the second feeders 112 are perpendicular to each other. The first dielectric layer 110 is preferably a dielectric material with low loss and high radiation efficiency. In this embodiment, the first dielectric layer 110 is a dielectric substrate Rogers 4350B.

The ground layer 120 is disposed on the first dielectric layer 110. The ground layer 120 is provided with a plurality of first slits 121 and a plurality of second slits 122, and the arrangement directions of the first slits 121 and the second slits 122 are perpendicular to each other. The arrangement direction of the first slit 121 is perpendicular to the arrangement direction of the first feeder 111, and the arrangement direction of the second slit 122 is perpendicular to the arrangement direction of the second feeder 112. The projections of the first slit 121 and the first feeder 111 on the first dielectric layer 110 are intersected with each other, and the projections of the second slit 122 and the second feeder 112 on the first dielectric layer 110 are intersected with each other. The shape of the first slit 121 and the second slit 122 may be oval, H-shaped, U-shaped or L-shaped in addition to rectangle, and the ground layer 120 is made of metal material.

The second dielectric layer 130 is disposed on the ground layer 120. The second dielectric layer 130 is preferably a dielectric material with low loss and high radiation efficiency. In this embodiment, the second dielectric layer 130 is a dielectric substrate Rogers 4350B.

The conductive patch layer 140 is disposed on the second dielectric layer 130. The conductive patch layer 140 is provided with an M*N linear antenna array, wherein M and N are positive integers greater than or equal to 2 such that the form of the antenna array can be automatically adjusted according to the strength of signals to achieve the reduction on input power of each array element. Also, the energy efficiency is improved, and the operating temperature of the chip is dynamically adjusted. Each array element of the linear antenna array includes a rectangular conductive patch and two feeding networks. The operating frequency band of each feeding network includes 28 GHz frequency band and 39 GHz frequency band, and only two feeding networks are provided for each array element so as to simplify the signal feeding network and reduce the coupling between various feeding network.

Figure 2:
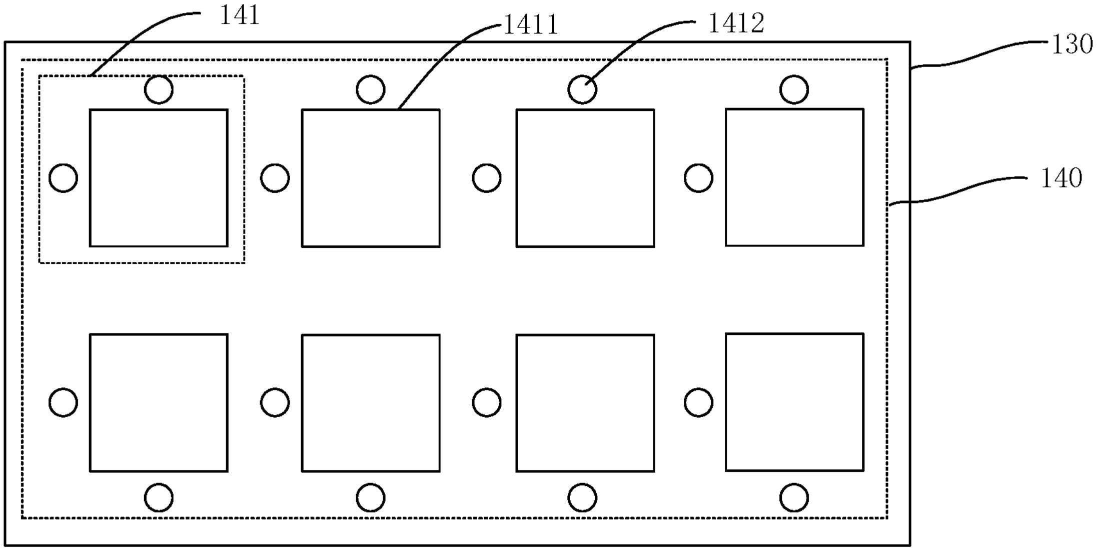
FIG. 2 is a top view of an array antenna provided in an embodiment of the present application.

Referring to FIG. 2, in an embodiment, the conductive patch layer 140 is provided with a 2*4 linear antenna array, and each array element 141 of the linear antenna array includes a rectangular conductive patch 1411 and two feeding networks 1412. The linear antenna array includes a first row of array elements and a second row of array elements, the two feeding networks 1412 of the first row of array elements correspond to two adjacent edges of a first corner of the rectangular conductive patch 1411 in one-to-one correspondence, the two feeding networks 1412 of the second row of array elements correspond to two adjacent edges of a second corner of the rectangular conductive patch 1411 in one-to-one correspondence, and the first corner and the second corner are adjacent angles (or supplementary angles). By utilizing two edges of different lengths of the rectangular conductive patch 1411 in the arrangement direction of the first feeder 111, dual-frequency operation of the microstrip antenna 10 can be realized under a single feed. This is beneficial to improve the radiation efficiency of the dual-frequency antenna and reduce the difficulty of manufacturing process. Correspondingly, the array antenna 100 can operate at two antenna operating frequencies when the second feeder 112 is feeding, and the two antenna operating frequencies are the same as two antenna operating frequencies at which the array antenna 100 operates when the first feeder 111 is feeding.

Figure 3:
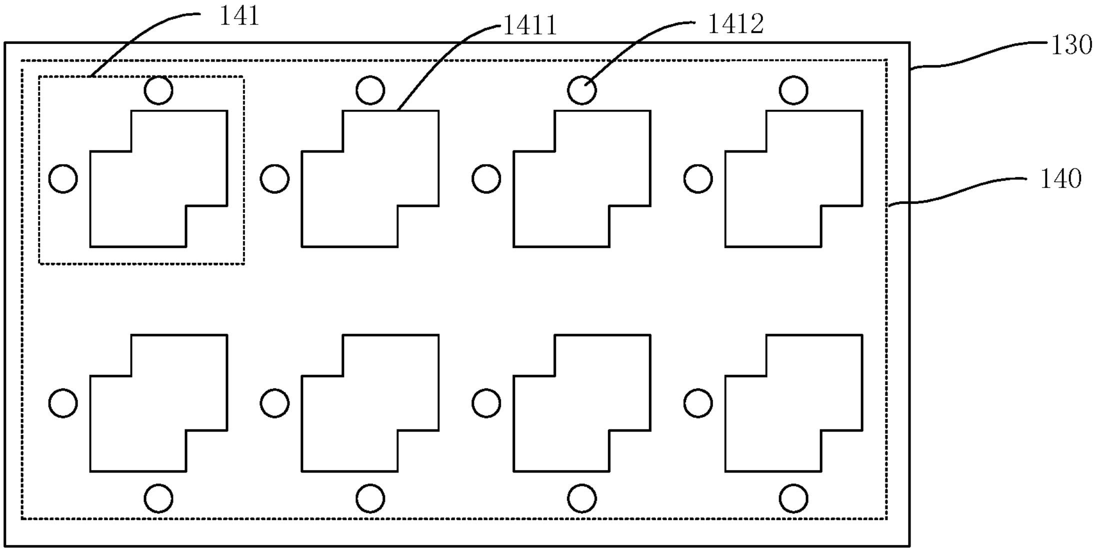
FIG. 3 is a top view of another array antenna provided in an embodiment of the present application.
Figure 4A:
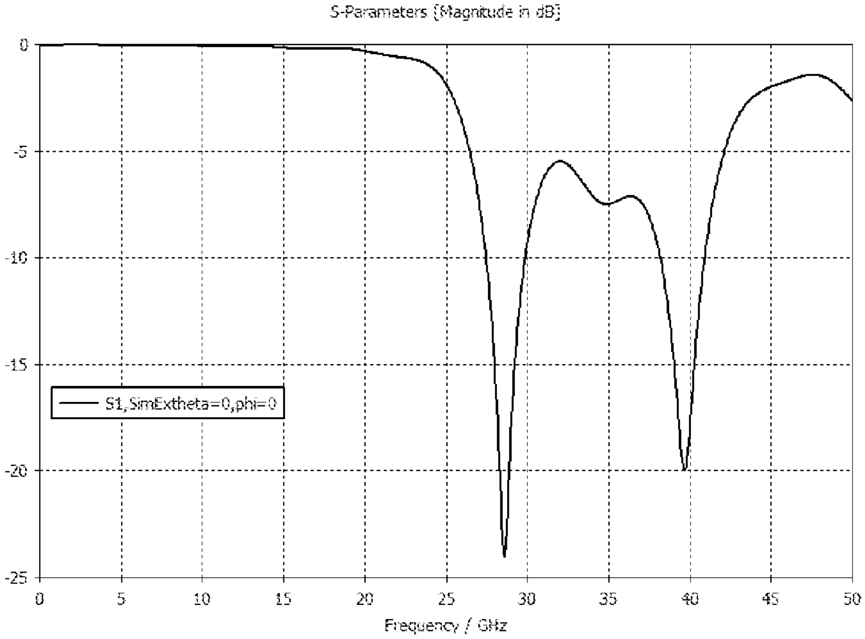
FIGS. 4*a* to 4*h* are simulation diagrams provided in an embodiment of the present application.
Figure 4B:
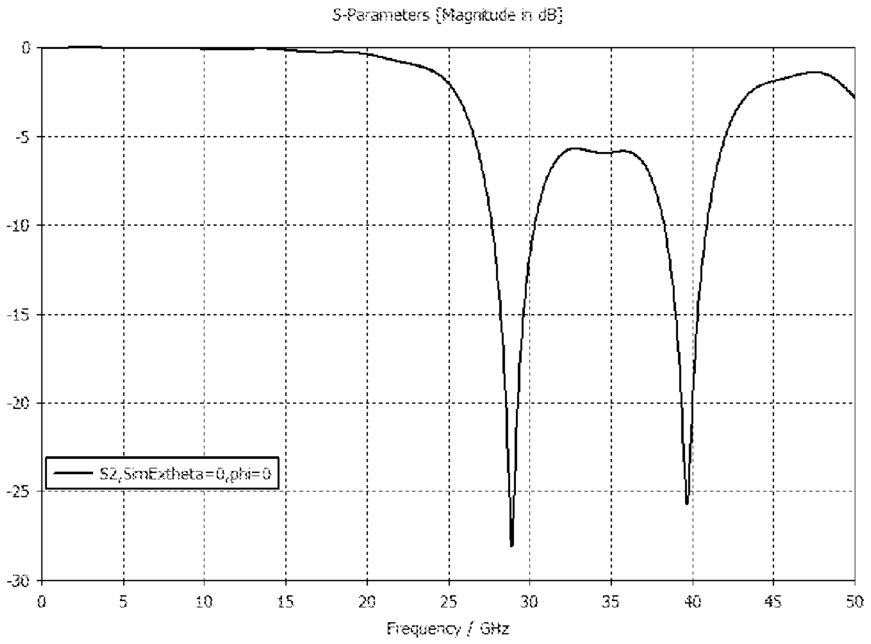
Figure 4C:
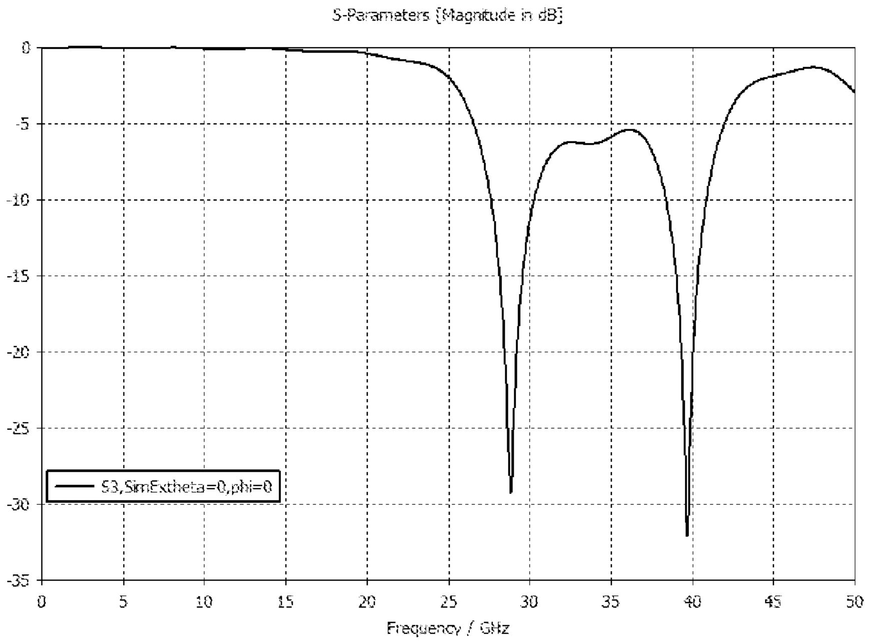
Figure 4D:
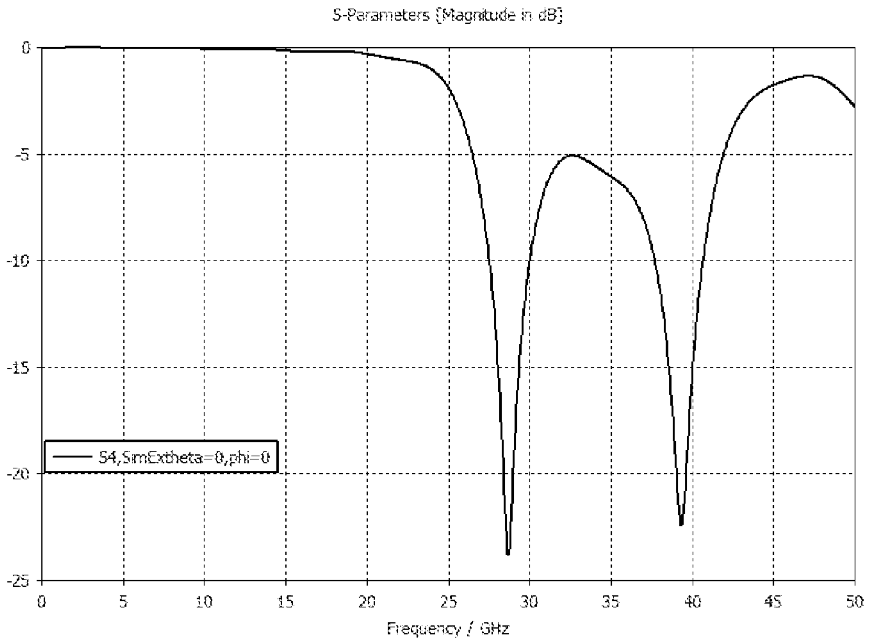
Figure 4E:
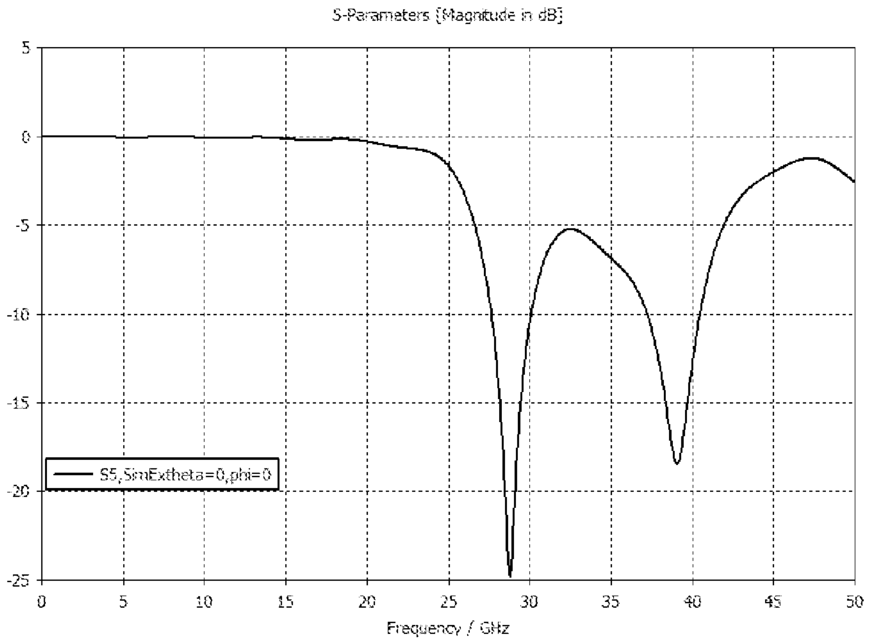
Figure 4F:
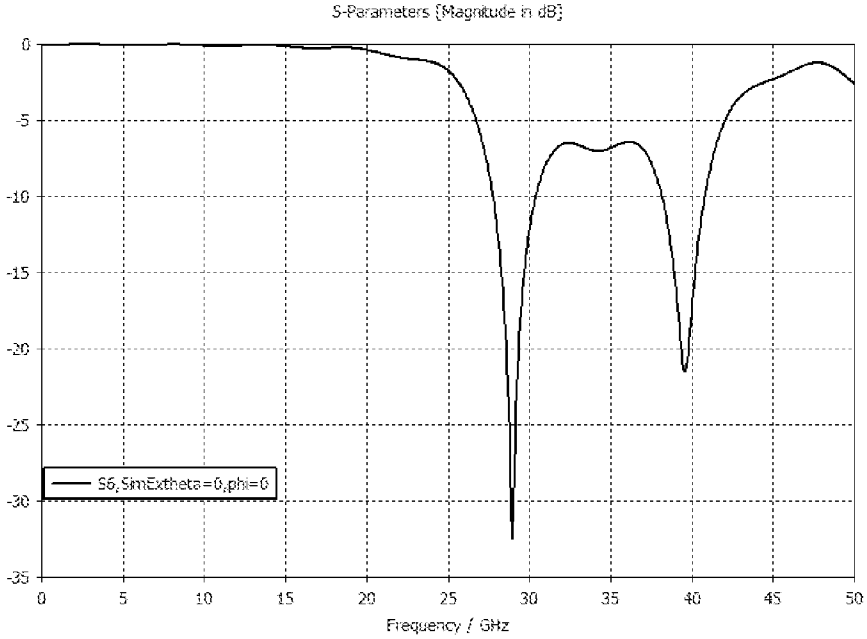
Figure 4G:
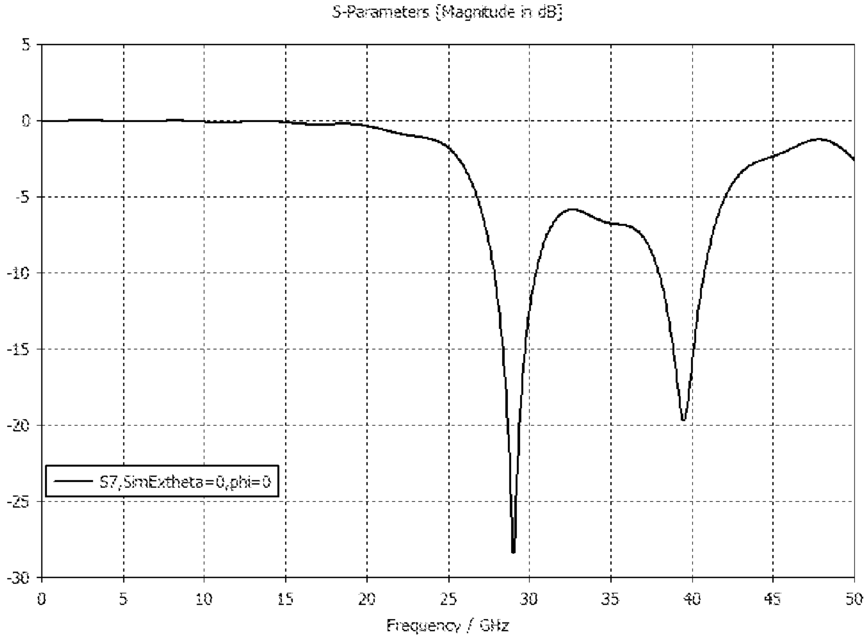
Figure 4H:
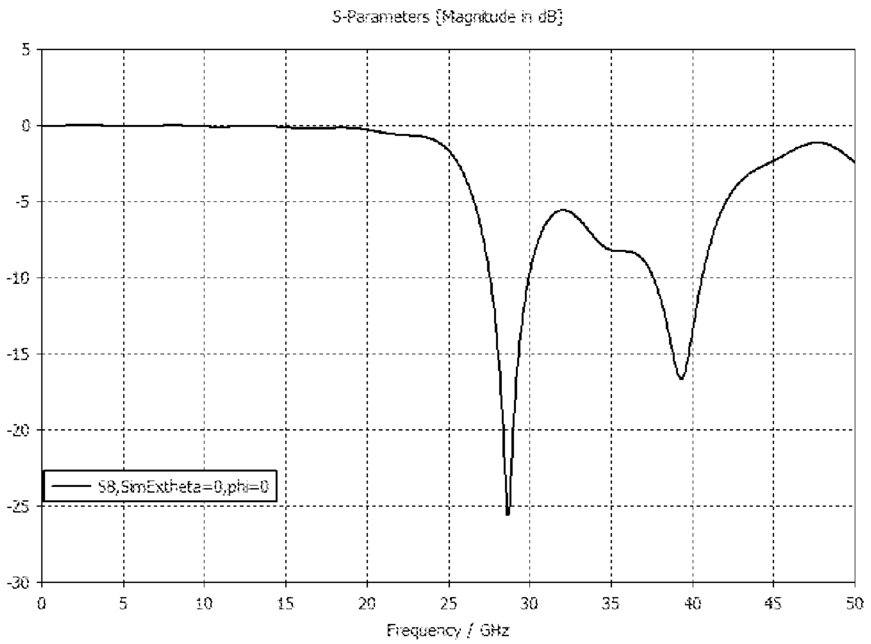

Referring to FIG. 3, in another embodiment, each of two opposite corners of the rectangular conductive patch 1411 is provided with a square cutout. The linear antenna array includes a first row of array elements and a second row of array elements, the two feeding networks 1412 of the first row of array elements correspond to two adjacent edges of a first corner of the rectangular conductive patch 1411 in one-to-one correspondence, the two feeding networks 1412 of the second row of array elements correspond to two adjacent edges of a second corner of the rectangular conductive patch 1411 in one-to-one correspondence, wherein the first corner is an angle corresponding to the square cutout, and the second corner is an adjacent angle of the first corner. In this way, two edges of different lengths of the conductive patch are obtained in the arrangement direction of the first feeder such that dual-frequency operation of the microstrip antenna can be realized under a single feed, thereby improving the radiation efficiency of the dual-frequency antenna and reducing the difficulty of manufacturing process.

The feeding mode of the array antenna includes coupling feeding. Specifically, the energy of the feeders (including the first feeder 111 and the second feeder 112) on the first dielectric layer 110 is coupled to the rectangular conductive patches 141 on the afore-mentioned conductive patch layer 140 via the slits (including the first slit 121 and the second slit 122), thereby radiating the energy.

Since the arrangement directions of the first feeder 121 and the second feeder 122 are perpendicular to each other and the two feeding networks 1412 of each array element 141 are designed to be orthogonal, orthogonal polarization of the two antenna operating frequencies of the array antenna can be realized by above arrangements, that is, support of dual-frequency and dual-polarized signals by the array antenna is realized. For example, the arrangement direction of the first feeder 111 is a horizontal direction, and the arrangement direction of the second feeder 112 is a vertical direction. Horizontal feeding and vertical feeding are performed on the afore-mentioned rectangular conductive patch via the first feeder 111 and the second feeder 112, respectively, so that horizontal polarization and vertical polarization of the two antenna operating frequencies (such as 28 GHz and 39 GHz) of the array antenna can be realized. Also, because of the orthogonal feeding, horizontally polarized signals and vertically polarized signals in each group are isolated with an amplitude below −30 dB.

Each array element 141 of the linear antenna array receives or transmits horizontally polarized signals and vertically polarized signals, so as to realize a high-gain antenna. The first row of array elements of the linear antenna array receive or transmit horizontally polarized signals, and the second row of array elements receive or transmit vertically polarized signals; or the first row of array elements of the linear antenna array receive or transmit vertically polarized signals, and the second row of array element receive or transmit horizontally polarized signals, so as to realize a low-gain antenna. This working mode can improve the coupling between array elements, thereby increasing the antenna gain.

Referring to FIGS. 4*a* to 4*h*, the horizontal coordinate is frequency/GHz, and the vertical coordinate is S parameter gain/decibel (dB). For example, the size of the array antenna is 23.2 mm×8.4 mm×1.06 mm (length×width×height), and its operating frequencies are 28 GHz and 39 GHz. When the array antenna 10 adopts the afore-mentioned slit-coupling feeding way and utilizes the afore-mentioned first feeder 111 (its arrangement direction is the horizontal direction) and second feeder 112 (its arrangement direction is the vertical direction) to perform the feeding simultaneously on each rectangular conductive patch 131, the reflection coefficient of the antenna is less than −10 dB so as to ensure high radiation efficiency of the antenna.

As shown in the table below:

| Array Antenna Gain | 1 × 4 Array Maximum Gain | | 2 × 4 Array Maximum Gain | |
|---|---|---|---|---|
| Beam Scan Angle | 28 GHz | | 28 GHz | 39 GHz |
| 0° | 10.5 dBi | 11.9 dBi | 11.5 dBi | 14.8 dBi |
| ±15° | 10.4 dBi | 11 dBi | 11.5 dBi | 13.9 dBi |
| ±30° | 10.2 dBi | 9.6 dBi | 11.3 dBi | 12.6 dBi |
| ±45° | 9.3 dBi | 8.2 dBi | 10.3 dBi | 11.9 dBi |

The gain of the 2*4 array is about 1 dB higher than that of the 1*4 array in the 28 GHz frequency band; the gain of the 2*4 array is about 3 dB higher than that of the 1*4 array in the 39 GHz frequency band. When the array antenna operates at the 39 GHz frequency band, at the maximum scan angle of ±45°, the gain of the 1*4 array drops by 3.7 dB, but the gain of the 2*4 array only drops by 1.9 dB.

This application increases the number of array elements through the arrangement of the plurality of rows of array elements, thereby reducing the maximum gain reduction of the array antenna in the maximum scan area, and by the arrangement, each feeding network supports the 28 GHz frequency band and the 39 GHz frequency band such that 2*2 MIMO signal differential communication is realized for each array element, thereby achieving support of dual-frequency and dual-polarization signals by the array antenna. Meanwhile, it can automatically adjust the antenna array form according to the strength of signals, thereby reducing the input power, improving the energy efficiency of the system and dynamically adjusting chip operating temperature.

Figure 5:
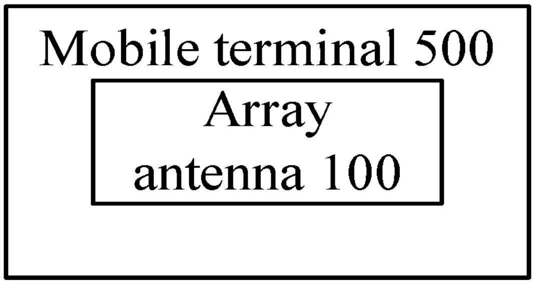
FIG. 5 is a structural schematic diagram illustrating a mobile terminal provided in an embodiment of the present application.

As shown in FIG. 5, the present application provides a mobile terminal 500 including an array antenna 100. The mobile terminal includes various types of 5G millimeter-wave mobile terminal products, such as a mobile phone, a Customer Premise Equipment (CPE) and a computer.

The array antenna and mobile terminal provided in the embodiments of the present application are described in detail above. The principle and implementation of the present application are described herein through specific examples. The description about the embodiments of the present application is merely provided to help understanding the method and core ideas of the present application. In addition, persons of ordinary skill in the art can make variations and modifications to the present application in terms of the specific implementations and application scopes according to the ideas of the present application. Therefore, the content of specification shall not be construed as a limit to the present application.

The invention claimed is:

1. An array antenna, comprising:

a first dielectric layer;

a ground layer, disposed on the first dielectric layer;

a second dielectric layer, disposed on the ground layer; and a conductive patch layer, disposed on the second dielectric layer, wherein the conductive patch layer is provided with an M*N linear antenna array, where M and N are positive integers greater than or equal to 2, and each array element of the linear antenna array comprises a rectangular conductive patch and two feeding networks, wherein each of two opposite corners of the rectangular conductive patch is provided with a square cutout, wherein the linear antenna array includes a first row of array elements and a second row of array elements, the two feeding networks of the first row of array elements correspond to two adjacent edges of a first corner of the rectangular conductive patch in one-to-one correspondence, the two feeding networks of the second row of array elements correspond to two adjacent edges of a second corner of the rectangular conductive patch in one-to-one correspondence, the first corner is an angle corresponding to the square cutout, and the second corner is an adjacent angle of the first corner.

2. The array antenna according to claim 1, wherein the first dielectric layer is provided with a plurality of first feeders and a plurality of second feeders, and arrangement directions of the first feeders and the second feeders are perpendicular to each other.

3. The array antenna according to claim 2, wherein the ground layer is provided with a plurality of first slits and a plurality of second slits, and arrangement directions of the first slits and the second slits are perpendicular to each other.

4. The array antenna according to claim 3, wherein the arrangement direction of the first slit is perpendicular to the arrangement direction of the first feeder, and the arrangement direction of the second slit is perpendicular to the arrangement direction of the second feeder, projections of the first slit and the first feeder on the first dielectric layer are intersected with each other, and projections of the second slit and the second feeder on the first dielectric layer are intersected with each other.

5. The array antenna according to claim 1, wherein each array element of the linear antenna array receives or transmits horizontally polarized signals and vertically polarized signals; or the first row of array elements of the linear antenna array receive or transmit horizontally polarized signals, and the second row of array elements receive or transmit vertically polarized signals; or the first row of array elements of the linear antenna array receive or transmit vertically polarized signals, and the second row of array element receive or transmit horizontally polarized signals.

6. The array antenna according to claim 1, wherein a feeding mode of the array antenna includes coupling feeding.

7. The array antenna according to claim 1, wherein operating frequency bands of each of the feeding networks comprise a 28 GHz frequency band and a 39 GHz frequency band.

8. A mobile terminal, comprising an array antenna, which comprises:

a first dielectric layer;

a ground layer, disposed on the first dielectric layer;

a second dielectric layer, disposed on the ground layer; and a conductive patch layer, disposed on the second dielectric layer, wherein the conductive patch layer is provided with an M*N linear antenna array, where M and N are positive integers greater than or equal to 2, and each array element of the linear antenna array comprises a rectangular conductive patch and two feeding networks, wherein each of two opposite corners of the rectangular conductive patch is provided with a square cutout, wherein the linear antenna array includes a first row of array elements and a second row of array elements, the two feeding networks of the first row of array elements correspond to two adjacent edges of a first corner of the rectangular conductive patch in one-to-one correspondence, the two feeding networks of the second row of array elements correspond to two adjacent edges of a second corner of the rectangular conductive patch in one-to-one correspondence, the first corner is an angle corresponding to the square cutout, and the second corner is an adjacent angle of the first corner.

9. The mobile terminal according to claim 8, wherein the first dielectric layer is provided with a plurality of first feeders and a plurality of second feeders, and arrangement directions of the first feeders and the second feeders are perpendicular to each other.

10. The mobile terminal according to claim 9, wherein the ground layer is provided with a plurality of first slits and a plurality of second slits, and arrangement directions of the first slits and the second slits are perpendicular to each other.

11. The mobile terminal according to claim 10, wherein the arrangement direction of the first slit is perpendicular to the arrangement direction of the first feeder, and the arrangement direction of the second slit is perpendicular to the arrangement direction of the second feeder, projections of the first slit and the first feeder on the first dielectric layer are intersected with each other, and projections of the second slit and the second feeder on the first dielectric layer are intersected with each other.

12. The mobile terminal according to claim 8, wherein each array element of the linear antenna array receives or transmits horizontally polarized signals and vertically polarized signals; or the first row of array elements of the linear antenna array receive or transmit horizontally polarized signals, and the second row of array elements receive or transmit vertically polarized signals; or the first row of array elements of the linear antenna array receive or transmit vertically polarized signals, and the second row of array element receive or transmit horizontally polarized signals.

13. The mobile terminal according to claim 8, wherein a feeding mode of the array antenna includes coupling feeding.

14. The mobile terminal according to claim 8, wherein operating frequency bands of each of the feeding networks comprise a 28 GHz frequency band and a 39 GHz frequency band.

* * * * *